United States Patent [19]

Matsuzaki

[11] Patent Number: 5,226,926
[45] Date of Patent: Jul. 13, 1993

[54] PLASTIC AND OIL WASTE PROCESSING METHOD

[75] Inventor: Tsutomu Matsuzaki, M-K Laboratory, 1584 Tsuzuki, Mikkabi-cho, Inasa-gun, Shizuoka-ken, Japan

[73] Assignees: Tsutomu Matsuzaki, Shizuoka; Chuo Kagaku Co., Ltd., Saitama, both of Japan

[21] Appl. No.: 899,019

[22] Filed: Jun. 15, 1992

Related U.S. Application Data

[63] Continuation of Ser. No. 648,679, Jan. 31, 1991, abandoned.

[30] Foreign Application Priority Data

Sep. 10, 1990 [JP] Japan ................... 2-239574

[51] Int. Cl.[5] .......................... C10L 5/48; C08J 11/04
[52] U.S. Cl. ...................... 44/530; 44/550; 521/40; 521/46.5
[58] Field of Search .............. 44/530, 550; 521/40, 521/46.5

[56] References Cited

U.S. PATENT DOCUMENTS 3,933,989 1/1976 Itoh ..................... 521/46.5
4,828,661 5/1989 Celi .................... 204/109

FOREIGN PATENT DOCUMENTS 7738594 9/1977 Japan .
54-127983 10/1979 Japan .
57-137389 8/1982 Japan .
8302281 7/1983 World Int. Prop. O. .

Primary Examiner—Prince Willis, Jr.
Assistant Examiner—Alan Diamond
Attorney, Agent, or Firm—Jordan and Hamburg

[57] ABSTRACT

A waste plastic material, e.g. hard plastic waste constituted of vinyl chloride, polyethylene, and foamed polystyrene, soft plastic waste, or other plastic waste containing metal fragments, is immersed in a vegetable or mineral oil heated to 110° to 180° C. for melting in to a saturation of the plastic waste, the proportion of the plastic waste added to the oil being sufficient to saturate the oil. The melted plastic material, in which quantities of the oil are entrapped is mixed with a given dose of a neutralizing agent, e.g. calcium hydroxide, at a temperature of 220° to 300° C. Then, the resultant mixture, in which a quantity of the oil is entrapped is shaped into a solid fuel product, or into a predetermined form disposable in a landfill.

12 Claims, 9 Drawing Sheets

PLASTIC AND OIL WASTE PROCESSING METHOD

This application is a continuation of application Ser. No. 07/648,679, filed Jan. 31, 1991, abandoned.

BACKGROUND OF THE INVENTION

The present invention relates to a plastic waste processing method by which a waste plastic material, e.g. hard plastic waste of vinyl chloride, polyethylene, or foamed polystyrene, soft plastic waste, and other plastic waste containing metal scrap, is processed to a solid fuel product or a particular form disposable in a landfill.

It is well known in the art of disposal of bulk plastic waste including hard plastics, e.g. vinyl chloride, polyethylene, or foamed styrol, soft plastics, other plastic waste containing metal scrap that a waste plastic material, which is commonly a mixture of hard plastic waste, soft plastic waste, metal scrap, waste films, and, so on, substantially requires size reduction by crushing, cutting, or grinding with the use of a corresponding device and also, separation of plastics from non-plastic fragments prior to the incineration or placement in a landfill.

However, such a known plastic waste processing method has a disadvantage that the preparatory separation of plastics is carried out by manual labor which adds to the cost.

Also, the use of the device for crushing, cutting, or grinding in the preparatory process requires a large amount of energy, e.g. electricity, thus increasing the overall cost, and involves the generation of vibration, noise, and dust which are undesirable operating conditions.

Furthermore, the disposal of untreated plastic waste in a landfill is limited in location and may result in a secondary assault on the environment. Similarly, the incineration of plastic waste occurs at particularly high temperature requiring the use of a difficult to develop, high-cost, heat-resistant incinerator, and produces a variety of toxic gases of which removal is troublesome.

SUMMARY OF THE INVENTION

It is thus an object of the present invention to provide a plastic waste processing method in which the preparatory procedure of crushing, cutting, or grinding a waste plastic material to be fed is eliminated, and the waste plastic material is easily softened and melted down without generation of toxic gases, e.g. hydrogen chloride, and then processed to a solid fuel product which will generate no toxic gas when burnt.

It is another object of the present invention to provide a plastic waste processing method in which a waste plastic material containing metal scrap from e.g. disposable cameras is separated, while the generation of any toxic gas, e.g. of hydrogen chloride, is prevented, into metal fragments and melted plastics which are in turn processed to a solid fuel product which will generate no toxic gas when burnt.

It is a further object of the present invention to provide a plastic waste processing method in which a waste plastic material is melted down in a mineral oil or a spent oil to a saturation level and a resultant plastic-saturated oil is converted into an appropriate form for safe disposal in a landfill.

The foregoing and other objects and novel features of the present invention will be more apparent from the following detailed description in conjunction with the accompanying drawings.

The drawings are for the purpose of assisting in describing the invention and are not intended to limit the scope or spirit of the present invention.

BRIEF DESCRIPTION OF THE INVENTION

DETAILED DESCRIPTION OF THE INVENTION

The present invention will be described in detail, by way of example, referring to the accompanying drawings.

Figure 1:
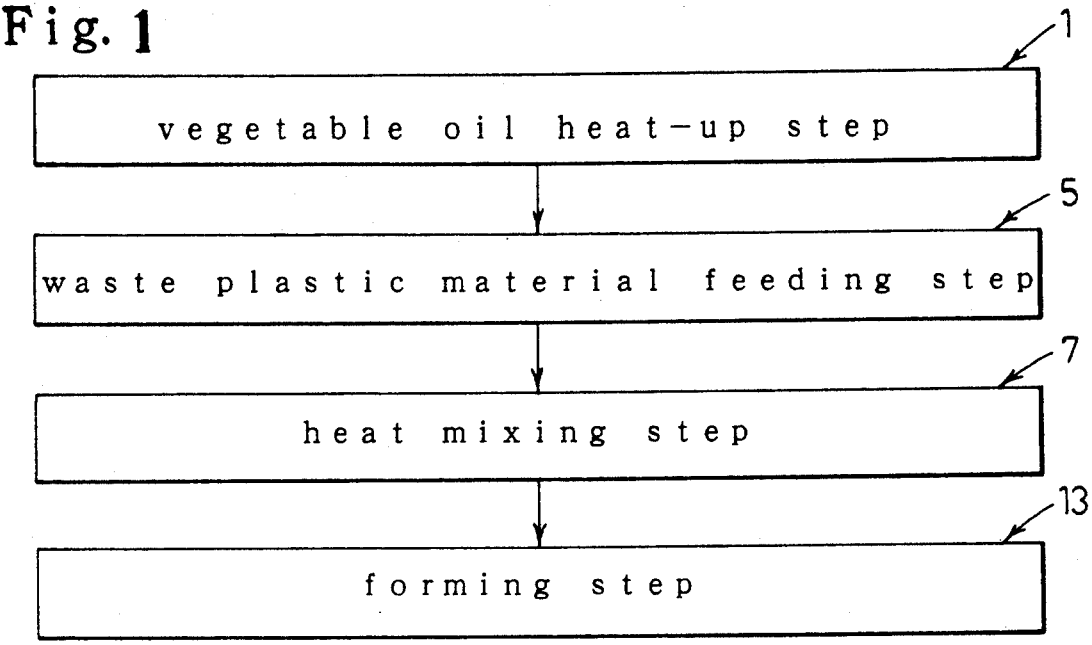
FIG. 1 is a flow chart showing one embodiment of the present invention.

A method according to the present invention starts with a vegetable oil heat-up step 1, as illustrated in FIG. 1, in which a vegetable oil contained in a top-opening vessel or the like is heated by a heating device to such a temperature that no toxic gas is generated and, simultaneously, a waste plastic material is readily softened and melted down, and, more preferably, to 110° C. to 180° C.

The vegetable oil used in the vegetable oil heat-up step 1 may be any of known types and, preferably, for the sake of cost saving and environmental protection, a spent oil which has been used in e.g. fry cooking.

The heating of the vegetable oil contained in the pot may be effected, by a heater equipped with a controller for maintaining the vegetable oil at a constant temperature.

Represented by the numeral 5 is a waste plastic material feeding step in which the waste plastic material is fed into the vegetable oil heated up to 110° to 180° C. by the vegetable oil heat-up step 1.

The waste plastic material to be fed into the heated vegetable oil tends to melt down and float soon after having being immersed at the waste plastic material feeding step 5 and, thus, may be supplied in the form of bulk solids which are not crushed or cut into pieces after the recovery.

Also, the waste plastic material may be hard or soft plastics, e.g. in film form, including vinyl chloride, polyethylene, foamed polystyrene, etc.

Then, a heat mixing step 7 is provided for collecting the floating waste plastic material melted down at the waste plastic material feeding step 5, adding a given amount of a neutralizing agent and of additional waste soft plastic material to the same, and mixing these materials together with a screw mixer or the like while being heated. This heat mixing step 7 is intended for efficiently generating and removing toxic gases, e.g. hydrogen chloride, which are commonly produced when a plastic material is burned, and for reducing the amount of the vegetable oil trapped in the melted plastic material.

The neutralizing agent employed in the heat mixing step 7 may be calcium hydroxide, which is capable of neutralizing a toxic hydrogen chloride gas, generated during heating of the melted waste plastic material, to form calcium chloride, the latter which is then removed. An appropriate dosage of the calcium hydroxide neutralizing agent is determined for example, a few percent of the sum of the melted plastic material and the added soft plastic material.

The temperature for heating the melted waste plastic material at the heat mixing step 7 is controlled so as to stimulate the generation of a toxic gas e.g. hydrogen chloride gas from the melted plastic material and increase the efficiency of mixing of the two plastic materials, namely to a range between 220° C. and 300° C.

The amount of the waste soft plastic material, which is added to the melted plastic material at the heat mixing step 7 for decreasing the proportion of the trapped vegetable oil, is preferably 10 to 50% of the melted plastic material.

Finally, a forming step 13 is provided in which a resultant plastic material mixture produced in the heat mixing step 7 is shaped by a forming device into a given configuration of solid fuel product. The forming device used in the forming step 13 may be a known former such as an extruder or a press machine.

The solid fuel product formed by the foregoing method contains the waste plastic material and the vegetable oil and does not generate toxic gas when heated and, thus, can be used as a high-calorie fuel material.

Other methods according to the present invention will now be described referring to FIGS. 2 to 11, in which like steps are represented by numerals like those in the description of the first method and not further explained.

Figure 2:
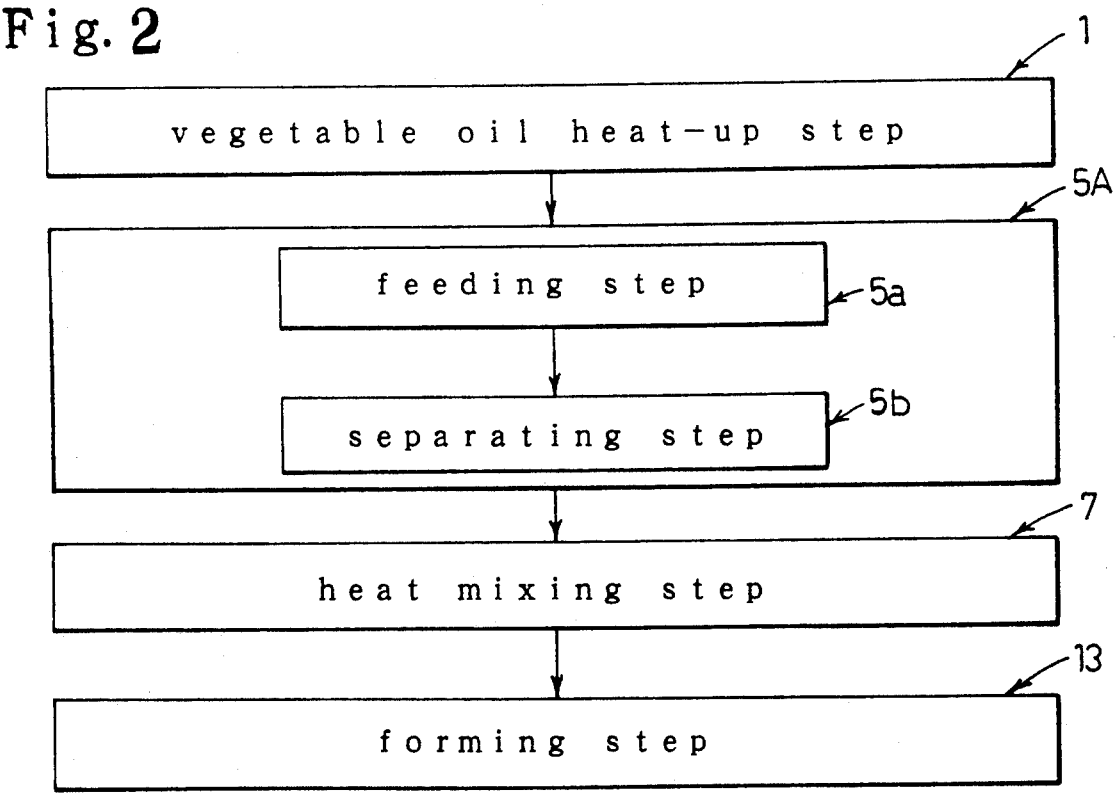
FIG. 2 is a flow chart showing a second embodiment of the present invention.

A second method of the present invention, shown in FIG. 2, is distinguished from the first method by providing a waste plastic material feeding step 5A which is constituted of a feeding step 5a for feeding into a heated vegetable oil a waste plastic material components of which e.g. disposable cameras contain metal scrap and a separating step 5b for separating the scrap metal from the melted waste plastic material by agitating the vegetable oil so that the scrap metal components accumulate on the bottom of the vessel containing the vegetable oil while the melted plastic material floats on the vegetable oil.

According to the second method having the waste plastic feeding step 5A, the waste plastic material mixed with metal scrap can be processed to a solid fuel product which contains no metallic fragments while the scrap metal is recovered, without crucial damage, for reuse, thanks to the heating temperature being as low as 110° to 180° C.

Figure 3:
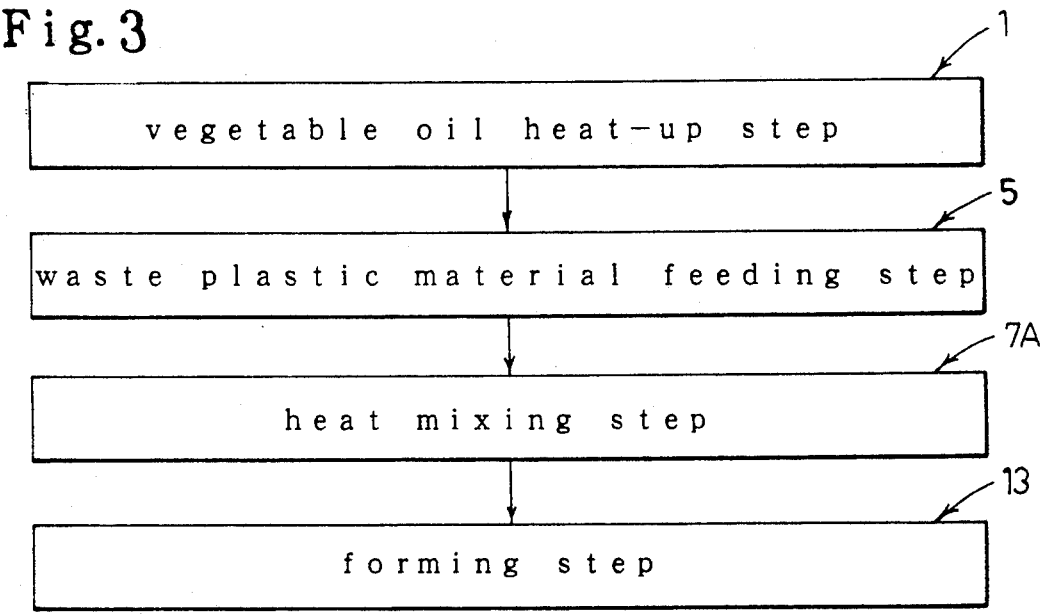
FIG. 3 is a flow chart showing a third embodiment of the present invention.

A third method of the present invention, shown in FIG. 3, is distinguished from the first method by providing a heat mixing step 7A in which the melted waste plastic material is mixed with a give amount of neutralizing agent while being heated. In this manner, the waste plastic material can be processed to a solid fuel product which contains a large amount of the vegetable, as in the method of FIG. 2.

Figure 4:
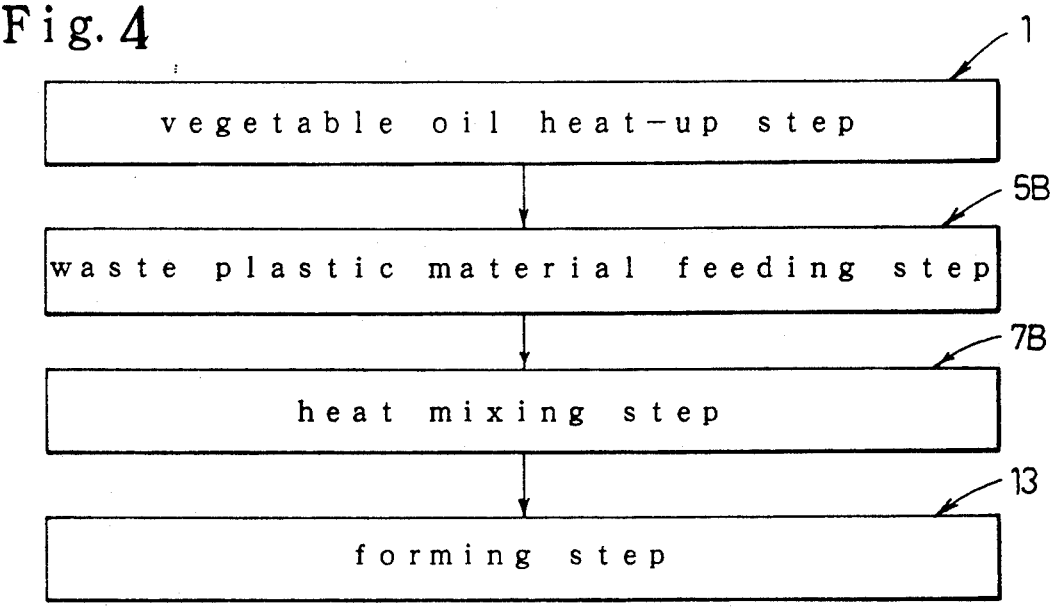
FIG. 4 is a flow chart showing a fourth embodiment of the present invention.

A fourth method of the present invention, shown in FIG. 4, is distinguished from the first method by providing a waste plastic material feeding step 5B and a heat mixing step 7B. In the waste plastic material feeding step 5B a selected waste plastic material which generates no hydrogen chloride gas during burning is fed into a heated vegetable oil. In the heat mixing step 7B, a given amount of waste soft plastic material which also generates no hydrogen chloride gas during burning is added to the waste plastic material melted down in the waste plastic material feeding step 5B.

Through the waste plastic material feeding step 5B and the heat mixing step 7B, the waste plastic material will be processed to a solid fuel product.

The heat mixing step 7B may be carried out without the addition of any waste soft plastic material.

Figure 5:
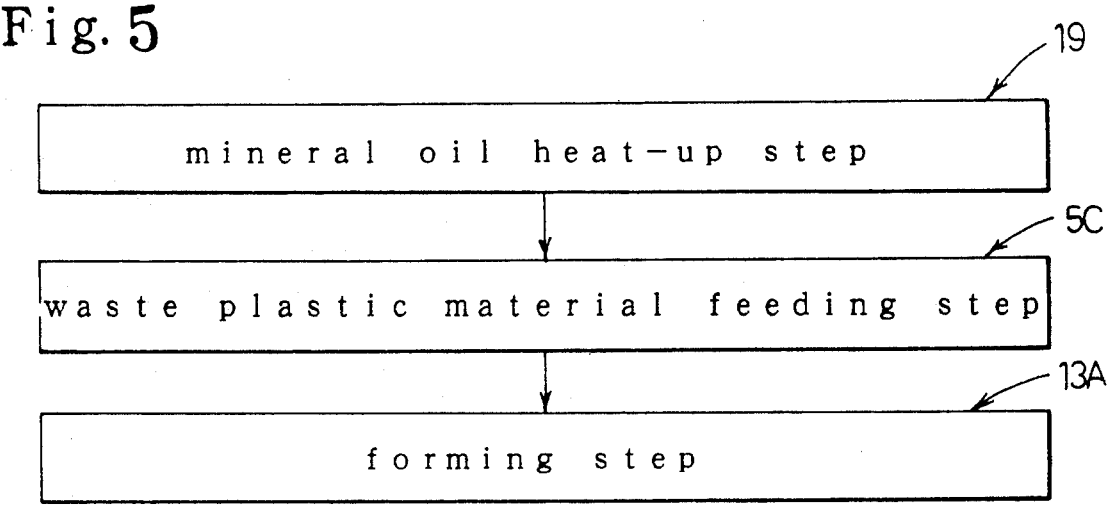
FIG. 5 is a flow chart showing a fifth embodiment of the present invention.
Figure 6:
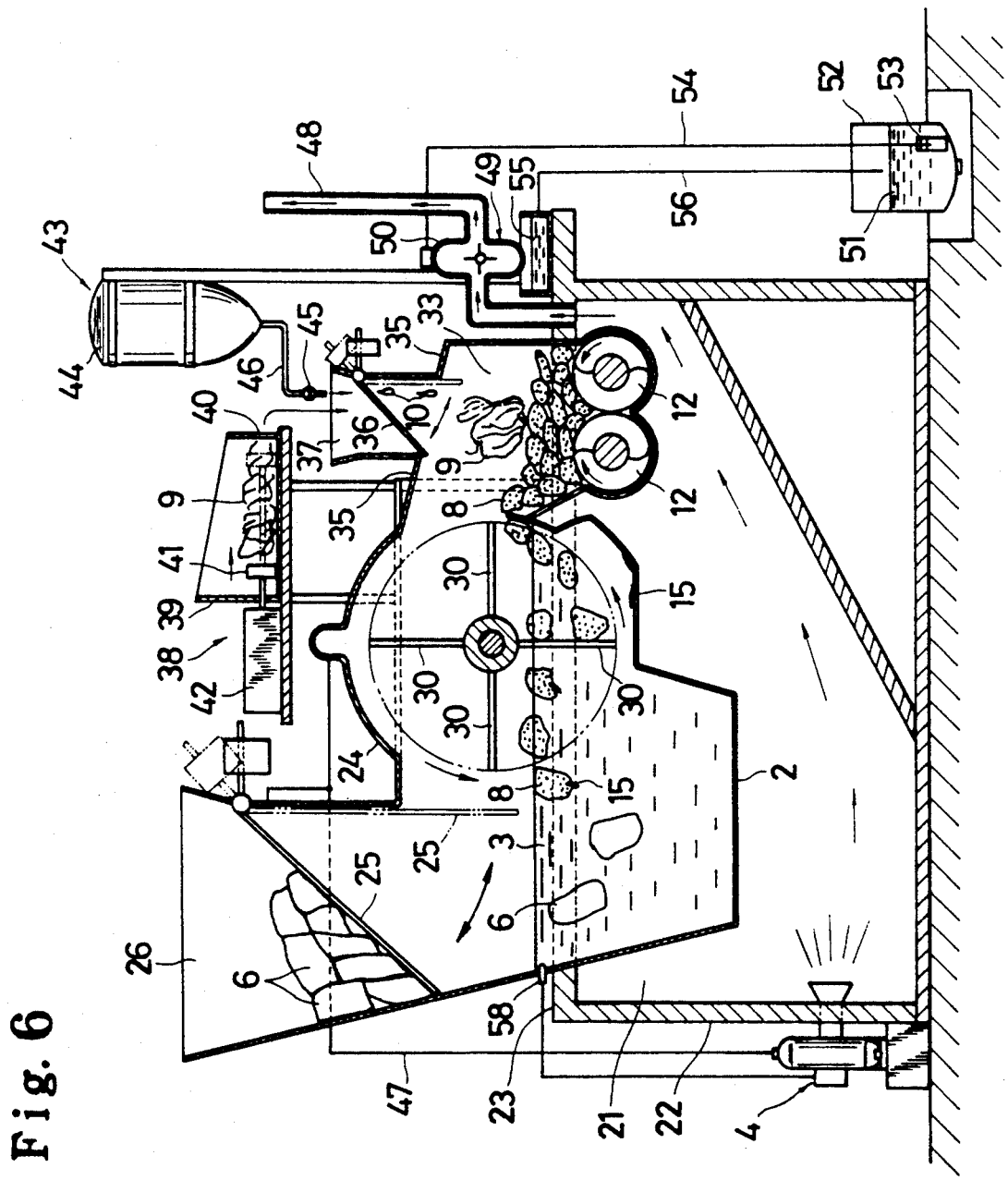
FIG. 6 is a cross sectional view showing a plastic waste processing apparatus arranged for implementation of the method of the present invention.
Figure 7:
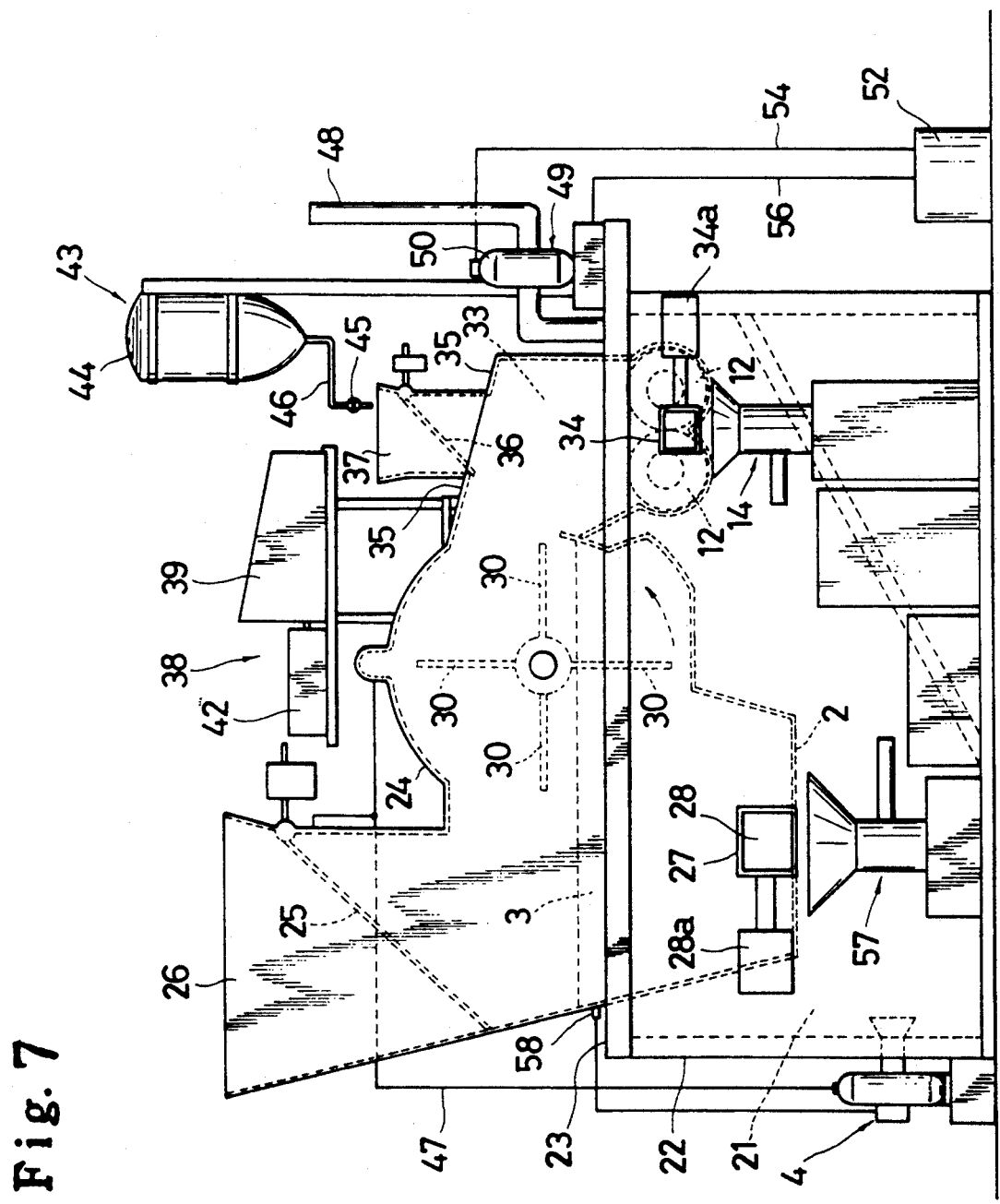
FIG. 7 is a front elevation view corresponding to FIG. 6.
Figure 8:
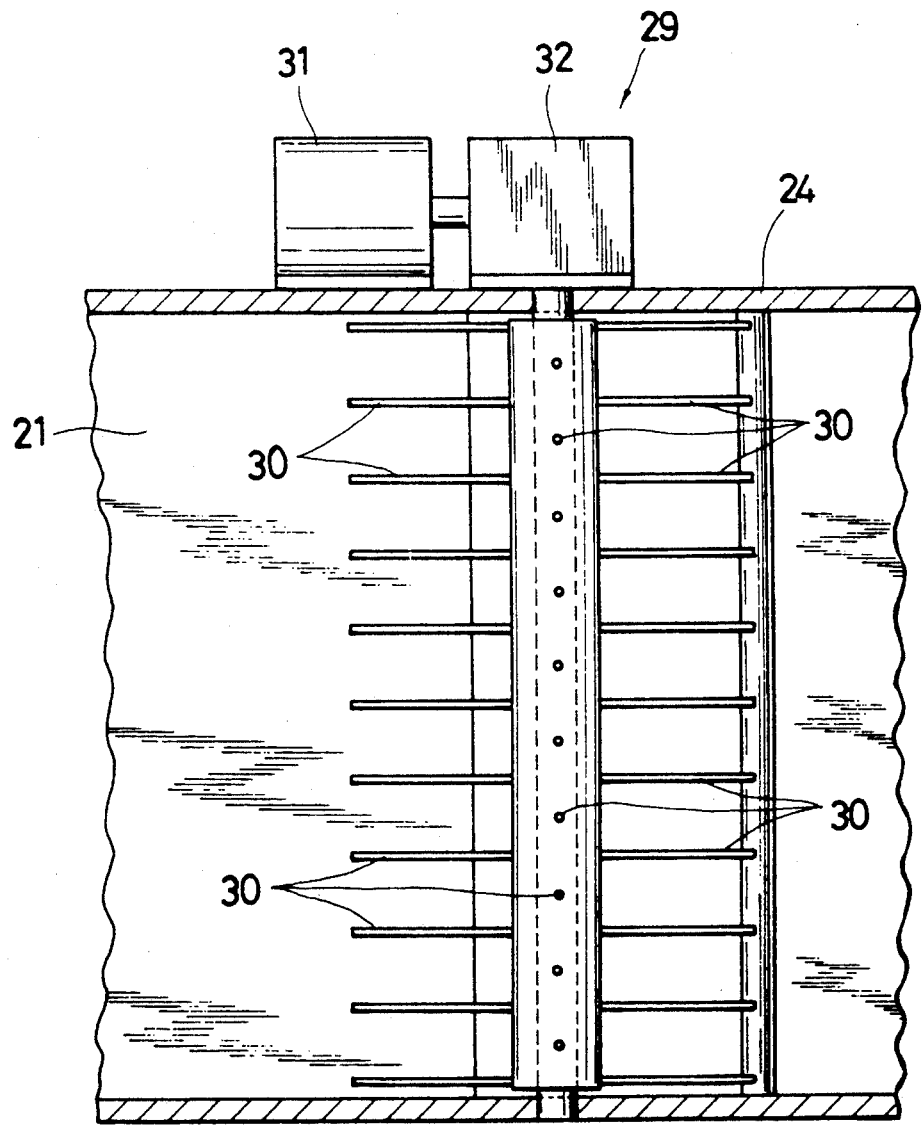
FIG. 8 is an explanatory view showing an agitator in the plastic waste processing apparatus of FIG. 6.

A fifth method of the present invention shown in FIG. 5, comprises, unlike the first method, a mineral oil heat-up step 19 for heating a mineral oil, e.g. a spent oil, contained in a vessel such as a top-opening pot, to about 110° to 180° C. using a heating device, a waste plastic material feeding step 5C for feeding a waste plastic material into the heated mineral oil until the mineral oil is saturated, and a forming step 13A for processing the mineral oil which is saturated with the melted waste plastic material, to an appropriate form for disposal in a landfill. Accordingly, the waste plastic material can be recovered for systematic placement in a landfill.

The mineral oil used at the mineral oil heat-up step 19 may be of any type and, more preferably, is a spent oil for cost saving. The latter is favored so that the simultaneous disposal of plastic waste and spent oil can be executed.

FIGS. 6 to 9 illustrate a plastic waste processing apparatus for implementation of the first to fifth methods of the present invention. As shown throughout FIGS. 6 to 9, represented by the numeral 2 is a vessel for filling with oil which is mounted on a top wall 23 of a casing 22 defining a combustion chamber 21. The vessel 2 is covered with a cover member 24 to allow recovery of a generated gas and coupled to a hopper 26 which is provided for feeding a waste plastic material and has a shutter 25.

Also, a burner 4 using gas or oil fuel is provided as the heating device for heating the combustion chamber 21.

A drain passage 27 extends from the lower extremity of the pot 2 across the combustion chamber 21 to the outside of the casing 22. An open/close valve 28 is mounted at the entrance of the drain passage 27 for opening and closing movement by the actuation of an electromagnetic solenoid 28a.

There is provided an agitator 29 which is equipped with agitating blades 30 and mounted on the cover member 24, also serving as a feeder. The agitator 29 is provided for agitating a melted waste plastic material 8 in order to separate metal fragments and components from the plastic material. Also, the agitator 29 has a motor 31 for rotation of the agitating blades 30 at a low speed because the waste plastic material 9 has been softened and melted down and a reducer 32 for reducing a driving force from the motor 31 and transmitting it to the agitating blades 30.

Denoted by 33 is a heating chamber for reception of the melted waste plastic material 8 transferred by the agitating blades 30 of the agitator 29 which acts as the feeder. The heating chamber 33 has at the bottom thereof a pair of mixing screws 12, 12 for discharging a resultant mixture, which has been produced in the chamber 33 and heated to 220° to 300° C. with the burner 4, through a discharging passage 34 provided with an open/close valve 34a actuated by e.g. an electromagnetic solenoid, to the outside of the casing 22.

The heating chamber 33 is defined at the upper end therefore by a heating chamber cover 35 so that a gas generated during heating will flow towards the cover member 24 of the vessel 2. A hopper 37 with a shutter 36 is mounted on the heating chamber cover 35 for feeding a waste soft plastic material 9 and a neutralizing agent 10, e.g. calcium hydroxide, into the heating chamber 33.

There is also provided a waste soft plastic material feeder 38 for feeding the waste soft plastic material 9 into the hopper 37. The waste soft plastic material feeder 38 comprises a waste soft plastic material container 39, a feeder opening 40 provided in a side wall of the container 39, a blade 41 mounted in the opposite side of the container 39 opposite to the feeder opening 40 for pushing the waste soft plastic material 9 through the feeder opening 40 towards the hopper 37, and a hydraulic cylinder 42 for actuating the blade 41.

Represented by 43 is a neutralizing agent feeder for feeding the catalyst 10 into the hopper 37. The catalyst feeder 43 comprises a tank 44 filled with the neutralizing agent and neutralizing agent feeder piping 46 having an open/close valve 45 for dispensing the neutralizing agent 10 from the tank 44 into the hopper 37.

A gas supply passage 47 is arranged for conveying a gas generated in the vessel 2 and the heating chamber 33 to the burner 4.

Also, an exhaust passage 48 is arranged for discharging an exhaust gas from the combustion chamber 21 and the heating chamber 33 to the outside, having a wet-type exhaust gas scrubbing device 49 mounted intermediate the inlet and the outlet thereof.

The wet-type exhaust gas scrubbing device 49 comprises a wet-type scrubber unit 50 mounted in the exhaust passage 48 intermediate the inlet and the outlet thereof, a supply conduit 54 having a pump 53 for feeding a neutralizing agent, e.g. sodium hydroxide, from a neutralizing agent reservoir 52 into the wet-type scrubber unit 50, and an exhaust conduit 56 for carrying a spent liquid 55 from the wet-type scrubber unit 50 back to the neutralizing agent reservoir 52.

Furthermore, there is provided a former 57 for converting the mineral oil 18 saturated with the waste plastic material 6 and discharged from the drain passage 27 into a solid form which can then be disposed in a landfill.

In particular, a primary former 14 is provided for forming a mixture delivered from the discharging passage 34 by the mixing screws 12, 12 into a solid fuel product.

Denoted by 58 is a thermal sensor for controlling the burner 4 to maintain the oil in the vessel at a desired temperature between 110° C. and 180° C.

In the operation of the foregoing plastic waste processing apparatus 60, the vegetable oil 3 is first supplied in 2 and heated by the burner 4 to a predetermined temperature of 110° to 180° C.

Then, the shutter 25 of the hopper 26 is opened for feeding the waste plastic material 6 into the heated vegetable oil 3.

The waste plastic material 6 immersed in the heated vegetable oil 3 is quickly softened and melted down to the melted plastic material 8 which in turn floats on the oil surface.

While floating on the oil surface, the melted plastic material 8 is agitated with the agitating blades 30 of the agitator 29 so that metal fragments and components move downward for separation from the plastics due to their greater specific gravity.

The melted plastic material 8 which is lesser in specific gravity than the metal fragments and components and remains on the oil surface, is then transferred by the agitating blades 8 into the heating chamber 33.

When the melted plastic material 8 enters the heating chamber 33, a given amount of the waste soft plastic material which equals 10 to 50% of the melted plastic material 8 is supplied from the hopper 37 of the waste soft plastic material feeder 48, with its shutter 36 turned open into the heating chamber 33 and, simultaneously, an amount of the neutralizing agent 10 which is equal to a few percent of the sum of the melted plastic material 8 and the waste soft plastic material 9 is dispensed through the hopper 37 onto the heating chamber 33.

Then, the lower extremity of the heating chamber 33 where the mixing screws 12, 12 are installed is heated by the burner 4 to 220° to 300° C. and, also, the melted plastic material 8, the waste soft plastic material 9, and the neutralizing agent 10 all are mixed up together through the movement of the mixing screws 12, 12.

During the mixing action, by-product hydrogen chloride gas generated from both the melted and soft plastic materials 8 and 9 is converted by the neutralizing action of the neutralizing agent 10 to calcium chloride for which is nontoxic and is discharged.

A resultant mixture carried by the mixing screws 12, 12 out from the discharging passage 34 and containing no hydrogen chloride gas is shaped by the former 14 to a desired configuration of solid fuel product.

Other gases generated in the vessel 2 and the heating chamber 33 during the foregoing procedure are fed via the gas supply passage 47 to the burner 4 where their combustible components are burnt.

In the end, while the exhaust gas is discharged from the exhaust conduit 48 to the outside, its toxic gas components including hydrogen chloride are neutralized by the neutralizing agent of the wet-type exhaust gas scrubbing device 49 to nontoxic fumes, e.g. calcium chloride, which are then released to the atmosphere.

Similarly, a waste plastic material 6A, e.g. from disposable cameras, which contains a variety of metal fragments and components can also be processed to a solid fuel product while the metal fragments and components are recovered at the lowermost extremity of the vessel 2 for reuse.

If it is assured that a major waste plastic material 6B supplied to the vessel 2 and a waste soft plastic material 9 added by the hopper 37 generate no hydrogen chloride as by-product the use of a neutralizing agent may be omitted during the process.

In this case, the neutralizing agent feeder 43 will be removed from the plastic waste material processing apparatus.

Also, if the waste plastic material 6 contains no metal waste, the agitator 29 may be eliminated from the arrangement of the apparatus.

Figure 9:
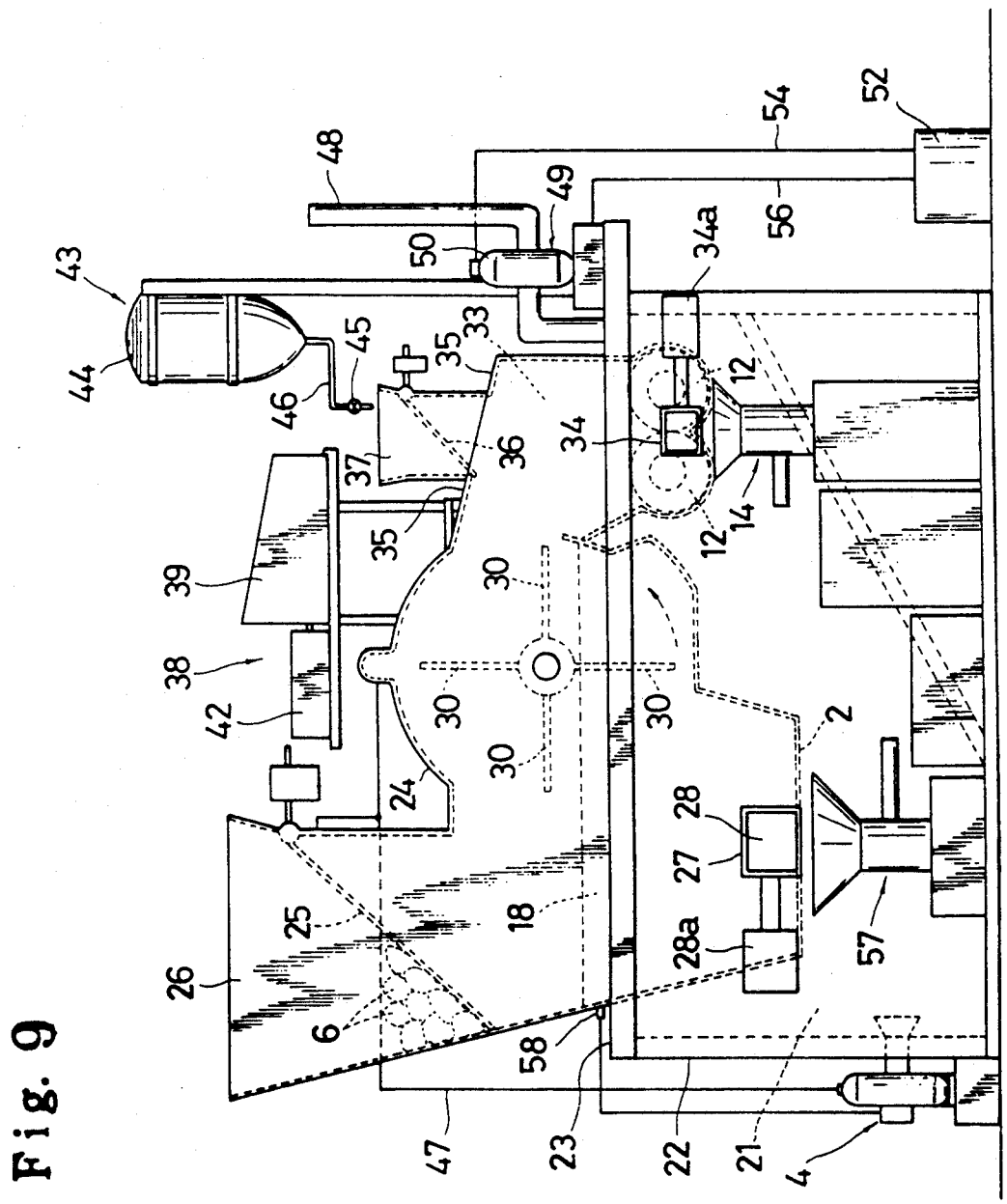
FIG. 9 is a front elevation view of the plastic waste processing apparatus of FIG. 6 explaining the use of a mineral oil.

In the operation with the vessel 2 filled with a mineral oil 18 or a spent oil as shown in FIG. 9, the waste plastic material 6 is first fed from the hopper 26 into the heated mineral oil 18 for melting down until the mineral oil 18 is saturated with the waste plastic material 6.

The mineral oil 18 saturated with the waste plastic material 6 is then transferred by opening the open/close valve 28 of the drain passage 27 to the former 57 where it is converted into a solid form which can be disposed of in a landfill.

For processing the waste plastic material 6 with the mineral oil 18, another apparatus not provided with the heating chamber 33, the waste soft plastic material feeder 38, the neutralizing agent feeder 43, the mixing screws 12, 12, and the former 14 may be used.

Figure 10:
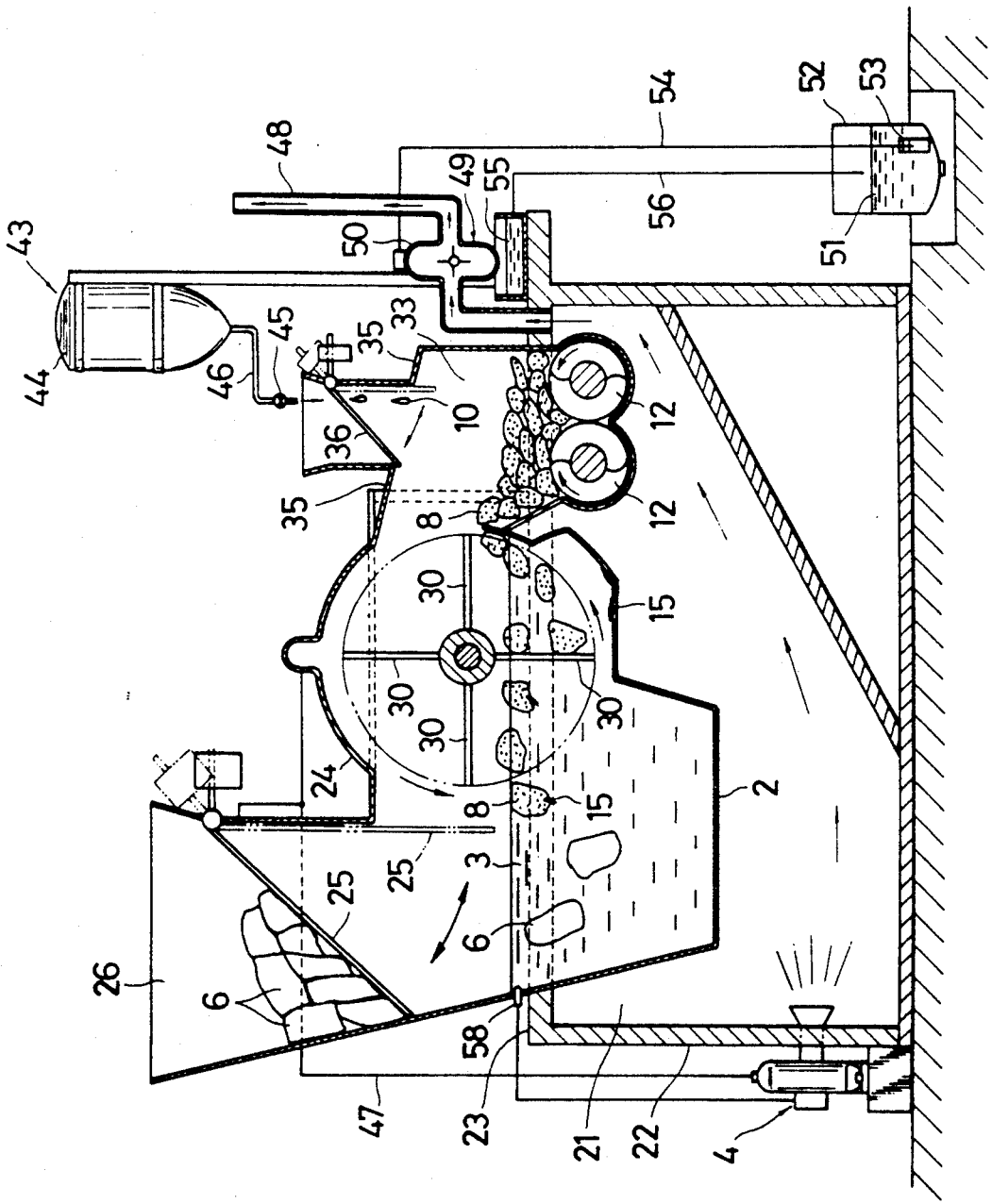
FIG. 10 is a cross sectional view showing another plastic waste processing apparatus arranged for implementation of the method of the present invention.

The arrangement shown in FIG. 10 is different from the plastic waste processing apparatus 60 portrayed in FIGS. 6 to 9, plastic material feeder is dispensed with, the apparatus is operated with the same success as the apparatus of FIGS. 6 to 9.

Figure 11:
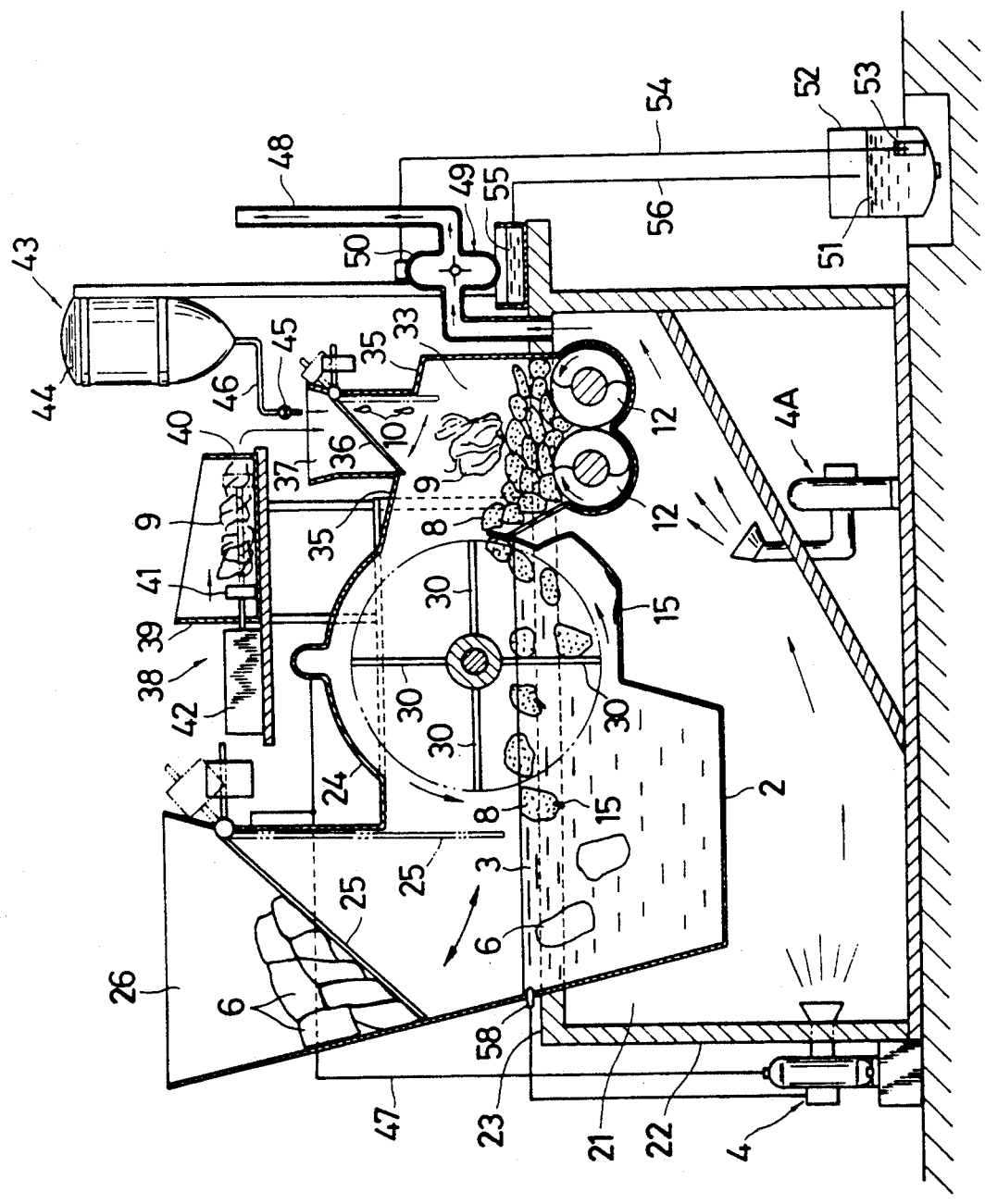
FIG. 11 is a cross sectional view showing a further plastic waste processing apparatus arranged for implementation of the method of the present invention.

Also, the arrangement shown in FIG. 11 is different from the apparatus illustrated in FIGS. 6 to 9. The vessel 2 and the mixing screws 12, 12 are heated by their respective burners 4 and 4A, and the apparatus is operated with the same success as the apparatus of FIGS. 6 to 9.

Although some of the foregoing methods of the present invention are described with reference to the feeding of additional soft plastic waste into the heating chamber 33, the use of other high calorie material such as powdered carbon or peat will be possible.

It would also be understood that the heating device in the apparatus is not limited to a burner and may be a heavy-oil heater, an electric heater, or the like.

As apparent from the foregoing description the present invention has the following advantages.

The prior art preparatory step of crushing, cutting, or grinding the waste plastic material is eliminated whereby the processing cost will be reduced and the operating conditions will be enhanced.

The waste plastic material is processed to a solid fuel product which will generate no toxic gas when being burnt.

Hence, any plastic waste which in the prior art, was substantially processed by a costly process can now be converted to solid high calorie fuel products which are suitable for sale.

Vegetable oil used in fry cooking is also processed at low cost so that an assault on the environment resulting from careless disposal of the vegetable oil can be prevented. Particularly, an apparatus for implementation of the method can easily be fabricated in an appropriate size ranging from a large system for industrial use to a small scale installation at the front of a private store, e.g. a supermarket.

No intricate technique is needed and the overall procedure is easy to carry out.

Mineral oil waste may be processed by saturation with a melted waste plastic material to a form disposable in a landfill.

Accordingly, both spent oil and plastic waste can simultaneously be processed to a mixture form for safe placement in a landfill and the disposal will be conducted with more efficiency.

What is claimed is:

1. A method of processing waste plastic and spent vegetable oil comprising heating said vegetable oil contained in a vessel to 110° C. to 180° C.; feeding said waste plastic material into the vegetable oil heated to 110° to 180° C. thereby to melt the waste plastic material and cause it to float on the surface of the vegetable oil, the waste plastic material being fed into the heated vegetable oil in a proportion sufficient to saturate the vegetable oil with the melted waste plastic material so that quantities of the vegetable oil are entrapped in the melted waste plastic material; recovering the waste plastic material floating on the surface of the vegetable oil, the recovered material containing quantities of vegetable oil entrapped therein, and mixing the recovered material with additional soft plastic waste and a neutralizing agent at a temperature of 220° to 300° C. thereby to neutralize hydrogen chloride gas generated from the melted waste plastic material for ease of removal; and shaping the resultant mixture, which contains quantities of the vegetable oil entrapped therein, into a solid fuel product.

2. A method of processing waste plastic and spent vegetable oil comprising: heating said vegetable oil contained in a vessel to 110° C. to 180° C.; feeding said waste plastic material, which does not generate hydrogen chloride gas during incineration, into the vegetable oil heated to 110° to 180° C. thereby to melt the waste plastic material and cause it to float on the surface of the vegetable oil, the waste plastic material being fed into the heated vegetable oil in a proportion sufficient to saturate the vegetable oil with the melted waste plastic material so that quantities of the vegetable oil are entrapped in the melted waste plastic material; recovering the waste plastic material floating on the surface of the vegetable oil, the recovered material containing quantities of the vegetable oil entrapped therein, and mixing the recovered material with a given amount of additional soft plastic waste which does not generate hydrogen chloride gas during incineration, at a temperature of 220° to 300° C.; and shaping the resultant mixture, which contains quantities of the vegetable oil entrapped therein, into a solid fuel product.

3. A method of processing waste plastic and spent vegetable oil comprising: heating said vegetable oil contained in a vessel to 110° to 180° C.; feeding said waste plastic material, which contains metal waste, into the vegetable oil heated to 110° to 180° C. thereby to melt the waste plastic material and cause it to float on the surface of the vegetable oil, the waste plastic material being fed into the heated vegetable oil in a proportion sufficient to saturate the vegetable oil with the melted waste plastic material so that quantities of the vegetable oil are entrapped in the melted waste plastic material; separating by agitation the waste plastic material which has been melted in the preceding step from the metal it had contained into the waste plastic material floating on the vegetable oil and the metal waste accumulating at the bottom and recovering the waste plastic material floating on the surface of the vegetable oil, the recovered material containing quantities of the vegetable oil entrapped therein, and mixing the recovered material with additional soft plastic waste and a neutralizing agent at a temperature of 220° to 300° C. thereby to neutralize hydrogen chloride gas generated from the melted plastic material for ease of removal; and shaping the resultant mixture, which contains quantities of the vegetable oil entrapped therein, into a solid fuel product.

4. A method of processing waste plastic and spent vegetable oil comprising: heating said vegetable oil contained in a vessel to 110° to 180° C.; feeding said waste plastic material into the vegetable oil heated to 110° to 180° C. thereby to melt the waste plastic material and cause it to float on the surface of the vegetable oil, the waste plastic material being fed into the heated vegetable oil in a proportion sufficient to saturate the vegetable oil with the melted waste plastic material so that quantities of the vegetable oil are entrapped in the melted waste plastic material; recovering the waste plastic material floating on the surface of the vegetable oil, the recovered material containing quantities of the vegetable oil entrapped therein, and mixing the recovered material with a neutralizing agent at a heating temperature of 220° to 300° C. thereby to neutralize hydrogen chloride gas generated from the melted waste plastic material for ease of removal; and shaping the resultant mixture, which contains quantities of the vegetable oil entrapped therein, into a solid fuel product.

5. A method of processing waste plastic and spent mineral oil comprising: heating said mineral oil contained in a vessel to 110° to 180° C.; feeding said waste plastic material into the mineral oil heated to 110° to 180° C. thereby to melt the waste plastic material and form a mixture thereof with the mineral oil, the waste plastic material being fed into the heated mineral oil in a proportion sufficient to saturate the mineral oil with the melted waste plastic material; and cooling and shaping the resultant mixture into a predetermined form.

6. A method according to claim 1, in which the amount of additional soft plastic waste is 10 to 50%, by weight, of the weight of the previously melted plastic material.

7. A method according to claim 1, in which the neutralizing agent is calcium hydroxide.

8. A method according to claim 6, in which the neutralizing agent is calcium hydroxide.

9. A method according to claim 3, in which the amount of additional soft plastic waste is 10 to 50%, by weight, of the weight of the previously melted plastic material.

10. A method according to claim 3, in which the neutralizing agent is calcium hydroxide and the neutralization of the hydrogen chloride gas produces calcium chloride.

11. A method according to claim 9, in which the neutralizing agent is calcium hydroxide and the neutralization of the hydrogen chloride gas produces calcium chloride.

12. A method according to claim 4, in which the neutralizing agent is calcium hydroxide and the neutralization of the hydrogen chloride gas produces calcium chloride.

* * * * *